US008284488B2

(12) United States Patent
Yabumoto et al.

(10) Patent No.: US 8,284,488 B2
(45) Date of Patent: Oct. 9, 2012

(54) OPTICAL LOW PASS FILTER

(75) Inventors: Hirotoshi Yabumoto, Tokyo (JP); Koichi Murata, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/034,729

(22) Filed: Feb. 25, 2011

(65) Prior Publication Data

US 2011/0149386 A1    Jun. 23, 2011

Related U.S. Application Data

(63) Continuation of application No. PCT/JP2009/064734, filed on Aug. 24, 2009.

(30) Foreign Application Priority Data

Aug. 29, 2008  (JP) ................................. 2008-220884

(51) Int. Cl.
*G02B 5/30* (2006.01)

(52) U.S. Cl. .......... 359/489.07; 359/489.08; 359/489.15

(58) Field of Classification Search ........................ None
See application file for complete search history.

(56) References Cited

U.S. PATENT DOCUMENTS

| | | | | |
|---|---|---|---|---|
| 6,327,085 B1 * | 12/2001 | Osawa et al. | ............ | 359/489.07 |
| 6,580,674 B1 | 6/2003 | Nishiyama et al. | | |

FOREIGN PATENT DOCUMENTS

| | | |
|---|---|---|
| JP | 3-158089 | 7/1991 |
| JP | 2002-303824 | 10/2002 |
| JP | 2004-29653 | 1/2004 |
| JP | 2004-61829 | 2/2004 |
| JP | 2006-84733 | 3/2006 |
| JP | 2006-113123 | 4/2006 |

OTHER PUBLICATIONS

International Search Report issued Oct. 20, 2009 in PCT/JP09/064734 filed Oct. 9, 2009.

\* cited by examiner

*Primary Examiner* — Derek S Chapel (74) *Attorney, Agent, or Firm* — Oblon, Spivak, McClelland, Maier & Neustadt, L.L.P.

(57) ABSTRACT

The present invention relates to a low pass filter including a wave plate capable of modulating incident light serving as image information such that A-polarized light and B-polarized light orthogonal to the A-polarized light are at an equivalent light quantity level over a visible light region, i.e., a transmittance takes a value close to 50%. According to the low pass filter of the present invention, it is possible to appropriately reduce a moiré phenomenon generated by an image sensor constituting the optical low pass filter including the above-described wave plate, and suppress degradation of an image quality caused by light quantity deflection of a separated light beam, and the low pass filter of the present invention is therefore useful.

16 Claims, 7 Drawing Sheets

OPTICAL LOW PASS FILTER

TECHNICAL FIELD

The present invention relates to an optical low pass filter used in an imaging device using a charge-coupled device (CCD) or a complementary metal oxide semiconductor (CMOS) image sensor which separates incident light into four light beams and performs information processing for the four light beams.

BACKGROUND ART

CCD and CMOS image sensors used in imaging devices such as a video camera, a digital camera, and the like convert a quantity of brightness and darkness of light incident as an external signal to a charge quantity, i.e., perform what is called photoelectric conversion, and sequentially process the electric signal to thereby generate a digital image. In such CCD and CMOS image sensors, since distortion resulting from sampling is generated in an image having a spatial frequency smaller than a pixel pitch of incident light and a pattern (moiré) different from an original image occurs, the CCD and CMOS image sensors are constituted to include an optical low pass filter in order to prevent the occurrence of the moiré. A specific optical low pass filter has a function of cutting the vicinity of a frequency (sampling frequency) of the pixel pitch which enters the image sensor by slightly separating an incident two-dimensional image in horizontal and vertical directions, and is so devised as to prevent the occurrence of the moiré phenomenon by the function.

Figure 11A:
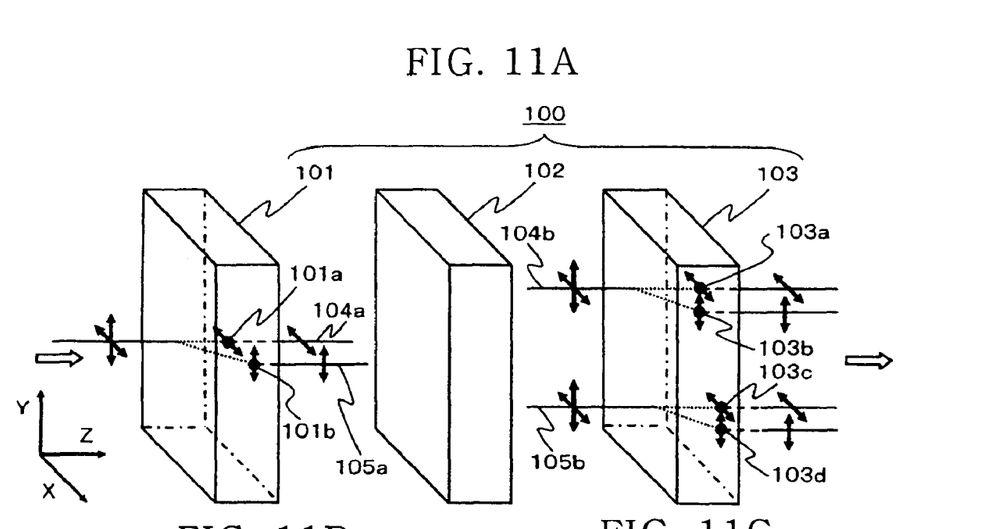
FIGS. 11A, 11B and 11C are explanatory views showing operations of a low pass filter.
Figure 11B:
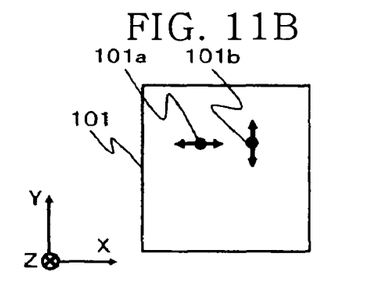
Figure 11C:
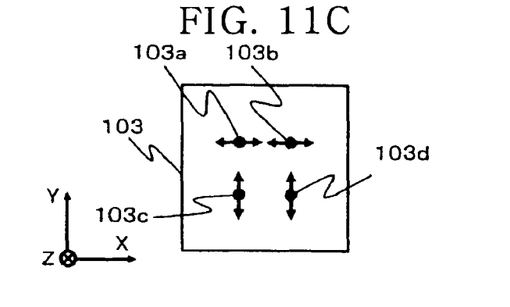

FIGS. 11A to 11C are schematic views specifically showing an example of a configuration of a low pass filter 100 which is disposed at a position before light becomes incident on the image sensor, and separates the light into four light beams, and a polarization state of the light. FIG. 11A is a three-dimensional schematic view of the low pass filter 100 in which a first optical path separation birefringent plate 101, a wave plate 102, and a second optical path separation birefringent plate 103 are disposed in the order of incidence of the light. In addition, FIG. 11B is a plan schematic view showing a position of light (light axis) having passed through the first optical path separation birefringent plate 101 and a polarization state thereof, while FIG. 11C is a plan schematic view showing a position of light (light axis) having passed through the second optical path separation birefringent plate 103 and the polarization state thereof.

A description is given of a state of light in the process where incident light passes through the low pass filter 100. In FIG. 11A, it is assumed that light incident on the low pass filter 100 is in a random polarization state, and travels in parallel with a Z-axis direction. Herein, the randomly polarized light is considered by dividing the randomly polarized light into two polarization components, and a component in parallel with an X-axis direction (hereinafter referred to as an A-polarized light) and a component in parallel with a Y-axis direction (hereinafter referred to as a B-polarized light) are considered. When the light becomes incident on the first optical path separation birefringent plate 101, the A-polarized light passes therethrough in a straight-ahead direction with respect to the incident direction of the light, while the B-polarized light follows a course separated from that of the A-polarized light to pass therethrough. It is to be noted that positions where the A-polarized light and the B-polarized light pass through the first optical path separation birefringent plate 101 are denoted by reference numerals 101a and 101b respectively, and these position are indicated in a transmission surface (X-Y plane) of the first optical path birefringent plate 101, as shown in FIG. 11B.

The light separated into an optical path 104a of the A-polarized light and an optical path 105a of the B-polarized light subsequently becomes incident on the wave plate 102. The wave plate 102 has a function of performing phase modulation on the light incident in a specific vibration direction such as the A-polarized light and the B-polarized light such that the A-polarized light (component) and the B-polarized light (component) have the same light quantity. The light having passed through the wave plate 102 in this manner travels straight with the A-polarized light and the B-polarized light mixed therein, and the light in correspondence to the optical path 104a of the A-polarized light is assumed to pass through the wave plate 102 and become incident on the second optical path separation birefringent plate 103 as the light of an optical path 104b, while the light in correspondence to the optical path 105a of the B-polarized light is assumed to pass through the wave plate 102 and become incident on the second optical path separation birefringent plate 103 as the light of an optical path 105b. At this point, in the second optical path separation birefringent plate 103, the A-polarized light and the B-polarized light are separated such that the A-polarized light and B-polarized light follow different courses in the same manner as in the above-described first optical path separation birefringent plate 101. At this point, the light separation direction in the first optical path separation birefringent plate 101 and the light separation direction in the second optical path separation birefringent plate 103 are made to be orthogonal to each other.

The reason why the separation directions are made to be orthogonal to each other as described above is that, since pixels of the image sensor are two-dimensionally arranged, in order to prevent the moiré with respect to two orthogonal directions of the arrangement, the light is separated in the separation directions matching with the arrangement directions of the pixels. In addition, the width of the separation (separation distance) differs according to the pitch of the pixels and the spatial frequency to be cut. Further, when a pixel shape is square, it is effective to have the same separation distance in the X direction and in the Y direction. However, in the case of the image sensor using, e.g., rectangular pixels (length of one pixel in Y direction>length of one pixel in X direction), a high priority is given to the prevention of the moiré in the X direction. Consequently, the separation distances in the X and Y directions may be different, and a quadrangle obtained by joining four separated points is not limited to a square and the quadrangle may be a parallelogram. Further, as described above, when a high priority is given to the prevention of the moiré in the X direction, there is a case where two-point separation only in the X direction is sufficient.

From each of the optical paths 104b and 105b of the incident light, the A-polarized light and the B-polarized light are separated in the second optical path separation birefringent plate, and pass therethrough. At this point, positions where the A-polarized light and the B-polarized light separated from the optical path 104b pass through the second optical path separation birefringent plate 103 are denoted by reference numerals 103a and 103b respectively, and positions where the A-polarized light and the B-polarized light separated from the optical path 105b pass through the second optical path separation birefringent plate 103 are denoted by reference numerals 103c and 103d respectively. Further, these positions are indicated in a transmission surface (X-Y plane) of the second optical path separation birefringent plate 103, as shown in FIG. 11C. Thus, when the light having components of both of the A-polarized light and the B-polarized light becomes incident, two orthogonal light components pass through the second optical path separation birefringent plate at two different positions for each light component.

There is reported, as the wave plate 102, a wave plate having, e.g., a function of converting incident A-polarized light and B-polarized light to circularly polarized light with an ellipticity close to 1 by using crystal as a ¼ wavelength plate (hereinafter referred to as a λ/4 plate) such that each of the incident A-polarized light and B-polarized light has the equivalent light quantity (Patent Document 1).

RELATED ART DOCUMENTS

Non-Patent Documents

Patent Document 1: Japanese Unexamined Patent Publication No. 2002-303824

SUMMARY OF THE INVENTION

Problem that the Invention is to Solve

For the wave plate constituting the low pass filter required for the image sensor used in the digital camera or the like described above, it is ideal that the proportion of light in correspondence to the A-polarized light or the B-polarized light with respect to the incident light quantity is 50% over the wavelength of a visible light region of the incident light. It is to be noted that the proportion of light passing through the wave plate in either one of the polarization directions is hereinafter referred to as a "transmittance". In the wave plate constituting a low pass filter unit described in Patent Document 1, the transmittance is 50% in the vicinity of 550 nm, which is close to the ideal value. However, the transmittance is not less than 75% with respect to the light of the wavelength of, e.g., 410 nm, and the transmittance is different from the ideal transmittance by not less than 25%. That is, when the light in 410 nm becomes incident, for example, the light quantity of the A-polarized light is about 75%, while the light quantity of the B-polarized light is about 25%. Consequently, in this case, even when the optical path separation is performed, there has been a problem that it is not possible to sufficiently eliminate the moiré in a blue image.

The present invention has been achieved in order to solve the above-described problem, and there is provided a low pass filter which separates incident light into four light beams of two light beams composed of a component in an A polarization direction, and two light beams composed of a component in a B polarization direction orthogonal to the A polarization direction, including a first optical path separation birefringent plate for performing separation in a first separation direction for each of the components in the two polarization directions, a wave plate, and a second optical path separation birefringent plate for performing separation in a second separation direction intersecting the first separation direction for each of the components in the two polarization directions which are disposed therein in an order of incidence of the light, wherein the wave plate includes at least one phase plate for changing a polarization state of the incident light, when the wave plate is constituted of one phase plate, an light axis of the one phase plate is so disposed as to intersect both of the A polarization direction and the B polarization direction, when the wave plate is constituted of two or more of the phase plates, their respective optic axes of at least two of the phase plates are so disposed as to intersect each other and intersect both of the A polarization direction and the B polarization direction, and, when a light quantity of light having passed through the wave plate in the A polarization direction with respect to a total light quantity of light of a given wavelength out of light having passed through the wave plate is assumed to be $I_x$ %, a diremption value $|50-I_x|$ defined by using a value of the $I_x$ which is maximally deviated from 50% with respect to light in a wavelength range of 410 to 600 nm out of the light having passed through the wave plate is not more than 20%.

In addition, there is provided a low pass filter which separates incident light into two light beams of a light beam composed of a component in an A polarization direction, and a light beam composed of a component in a B polarization direction orthogonal to the A polarization direction, including a wave plate, and an optical path separation birefringent plate which are disposed therein, wherein the wave plate includes at least one phase plate for changing a polarization state of the incident light, when the wave plate is constituted of one phase plate, an optic axis of the one phase plate is so disposed as to intersect both of the A polarization direction and the B polarization direction, when the wave plate is constituted of two or more of the phase plates, their respective optic axes of at least two of the phase plates are so disposed so to intersect each other and intersect both of the A polarization direction and the B polarization direction, and, when a light quantity of light having passed through the wave plate in the A polarization direction with respect to a total light quantity of light of a given wavelength out of light having passed through the wave plate is assumed to be $I_x$ %, a diremption value $-50-I_x|$ defined by using a value of the $I_x$ which is maximally deviated from 50% with respect to light in a wavelength range of 410 to 600 nm out of the light having passed through the wave plate is not more than 20%.

With this configuration, since it is possible to suppress wavelength dependence and reduce the difference between the light quantities to be separated in a desired wavelength range when compared with conventional low pass filters, the effect is achieved that the occurrence of moiré can be suppressed at a specific level in the wavelength range of the incident light. It is to be noted that the wave plate may also be constituted of, e.g., three phase plates, and the wave plate may be adjusted appropriately such that the diremption value $|50-I_x|$ in 410 to 600 nm is significantly reduced to, e.g., not more than 20% using two phase plates, and the diremption value is further reduced using the third phase plate.

Further, there is provided the above-described low pass filter wherein the wave plate includes the one phase plate, and, when a retardation value of the one phase plate is represented by Rd [nm], an angle formed by a polarization direction of light which incident in the A polarization direction or the B polarization direction and the optic axis of the one phase plate is represented by an intersection angle θ [°], and the most acute intersection angle formed by the optic axis with respect to the A polarization direction or the B polarization direction is represented by $θ_{min}$, coordinates of the Rd and the $θ_{min}$ (Rd, $θ_{min}$) fall in a range of a region surrounded by a point (245, 17), a point (310, 30), and a point (130, 31), or a region surrounded by a point (245, −17), a point (310, −30), and a point (130, −31).

With this configuration, it is possible to reduce the difference between the light quantities to be separated in a desired wavelength range using conditions obtained by the configuration of one phase plate, and thereby suppress the occurrence of the moiré. The difference between the light quantities to be separated means a difference between two light components orthogonal to each other in the light passing through the wave plate. Particularly in this configuration, the wave plate functions as a ½ wavelength plate with respect to the light in the desired wavelength range. The wave plate used in the conventional low pass filter functions as a ¼ wavelength plate, and converts incident linearly polarized light to circularly polarized light. Actually, the linearly polarized light is not necessarily converted to the circularly polarized light (ellipticity=1) in the entire desired wavelength range, and is converted to elliptically polarized light (0<ellipticity<1) when the wavelength becomes different. On the other hand, in the ½ wavelength plate of this configuration as well, the light is not necessarily converted to the linearly polarized light (ellipticity=0) in the entire desired wavelength range, and the light is converted to the elliptically polarized light when the wavelength becomes different. However, with regard to the difference when the light is separated into the above-described two light components orthogonal to each other, since the ½ wavelength plate is lower in incident light wavelength dependence than the ¼ wavelength plate so that the difference between the two light components orthogonal to each other can be reduced in the desired wavelength range by this configuration, the wave plate is characterized in that the light quantities of the individual components can be made almost equal to each other. It is to be noted that this technological concept applies to a wave plate constituted of two phase plates described below.

Furthermore, there is provided the above-described low pass filter wherein the wave plate is constituted of the two phase plates, and,
when the two phase plates are designated as a first phase plate and a second phase plate in the order of incidence of the light, a retardation value of the first phase plate is represented by $Rd_1$, a retardation value of the second phase plate is represented by $Rd_2$, a counterclockwise direction when viewed from an incident surface side with respect to the A polarization direction or the B polarization direction is assumed to be a plus direction, optic axes of the two phase plates are a combination of fast axes or slow axes, an angle formed by the optic axis of the first phase plate is represented by an intersection angle $\theta_1$, and an angle formed by the optic axis of the second phase plate is represented by $\theta_2$, the $Rd_1$ is in a range of more than 0 and not more than 1200 nm, the $Rd_2$ is in a range of 120 to 320 nm, and the $\theta_1$ and the $\theta_2$ are a combination in a range of any one of the following (1) to (4):

$$16 \leq |\theta_1 - \theta_2| \leq 28 \quad (1)$$

$$60 \leq |\theta_1 - \theta_2| \leq 69 \quad (2)$$

$$110 \leq |\theta_1 - \theta_2| \leq 119 \quad (3)$$

$$151 \leq |\theta_1 - \theta_2| \leq 160 \quad (4).$$

With this configuration, it is possible to further reduce the difference between the light quantities to be separated in the desired wavelength range using conditions obtained by the configuration of the two phase plates, and the effect is achieved that the occurrence of the moiré is further suppressed.

Moreover, there is provided the above-described low pass filter wherein the wave plate is formed of a resin material.

In addition, there is provided the above-described low pass filter wherein an IR cut layer for significantly reducing the light quantity of the wavelength in an infrared region is disposed.

Advantage of the Invention

The present invention has been achieved in order to solve the above-described problem of the prior art, and can provide a low pass filter including a wave plate capable of modulating incident light serving as image information such that A-polarized light and B-polarized light orthogonal to the A-polarized light are at an equivalent light quantity level over a visible light region, i.e., a transmittance takes a value close to 50%.

MODE FOR IMPLEMENTING THE INVENTION (First Embodiment)

Figure 1A:
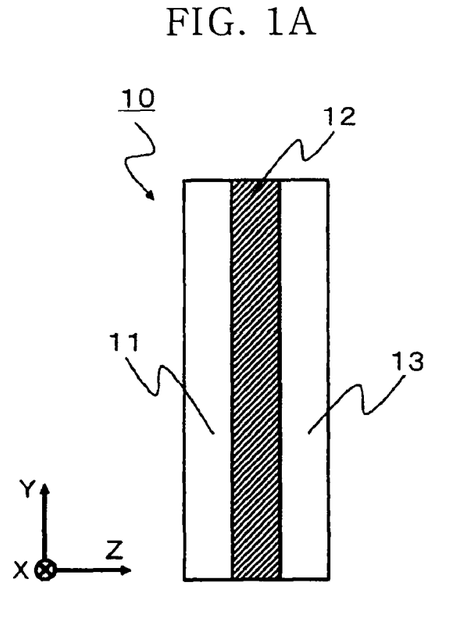
FIGS. 1A and 1B are cross-sectional schematic views of low pass filters according to a first embodiment.
Figure 1B:
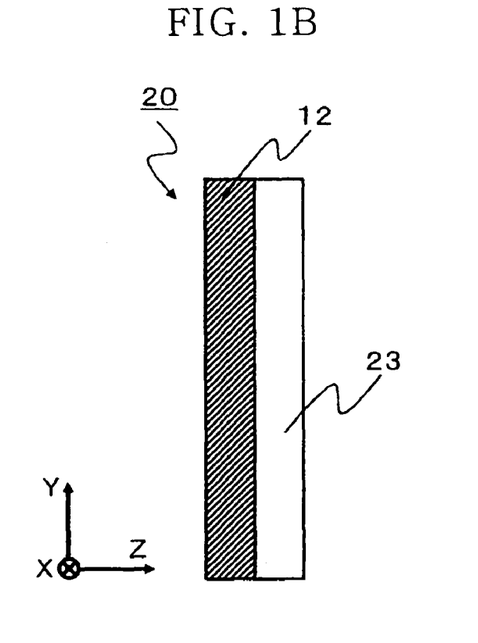

FIGS. 1A and 1B are cross-sectional schematic views showing a configuration of each of low pass filters 10 and 20 according to the present embodiment. The low pass filter 10 shown in FIG. 1A includes a first optical path separation birefringent plate 11, a wave plate 12, and a second optical path separation birefringent plate 13, and light from the outside is assumed to become incident in this order (Z direction). Although a description is given on the assumption that the separation direction of light incident on the first optical path separation birefringent plate 11 is an X direction, and the separation direction of light incident on the second optical path separation birefringent plate 13 is a Y direction, respective separation directions of the optical path separation birefringent plates may be reversed (Y direction and X direction). In addition, in the present embodiment, the wave plate 12 is constituted of one phase plate having birefringence. The low pass filter 20 shown in FIG. 1B includes the above-described wave plate 12 and an optical path separation birefringent plate 23, and light from the outside is assumed to become incident in this order (Z direction). It is to be noted that the optical path separation birefringent plate 23 has the same function as that of the first optical path separation birefringent plate 11 or the second optical path separation birefringent plate 13. A description is given hereinbelow of the low pass filter 10.

As a material for forming the optical path separation birefringent plate, examples of a crystal material include crystal, yttrium.orthovanadate ($YVO_4$) crystal, calcite ($CaCO_3$), rutile ($TiO_2$), and lithium niobate ($LiNbO_3$). In addition, examples of a resin material include polyimide, polyamide imide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, cellulose-based plastics, and polyolefin. Further, a liquid crystal material including polymeric liquid crystal from which birefringence is obtainable may also be used.

In addition, as a material for forming the phase plate constituting the wave plate 12, although a polymer film made of polycarbonate which exhibits refractive index anisotropy by drawing or the like, or polymeric liquid crystal which exhibits refractive index anisotropy by orientation treatment are preferably used, the material is not limited thereto. Examples of a crystal material include crystal, yttrium-orthovanadate ($YVO_4$) crystal, calcite ($CaCO_3$), rutile ($TiO_2$), and lithium niobate ($LiNbO_3$). Further, examples of a resin material include polyimide, polyamide imide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, cellulose-based plastics, and polyolefin.

Furthermore, a configuration may also be adopted in which there is laminated, on the low pass filter, an IR cut layer, which is not shown, for reducing infrared rays in order to prevent reproduction of an image different from an image seen by a human being by photoelectrically converting light in a wavelength different from a luminous efficacy of a human being when near infrared rays become incident on the image sensor. The IR cut layer has an important function of removing light which is not necessary for a digital camera or the like, and adjusting the sensitivity of the image sensor to the luminous efficacy of a human being (the most perceptible light wavelength in visible light: the vicinity of 550 nm). In order to remove the unnecessary light, it is desirable to dispose the IR cut layer at a position as close to the incidence side as possible among optical components and, when the IR cut layer is disposed in the low pass filter of the present invention, it is appropriate to dispose the IR cut layer on the light incidence side of the first optical path separation birefringent plate 11. However, the position thereof is not limited thereto, and the IR cut layer may be disposed between the first optical path separation birefringent plate 11 and the second optical path separation birefringent plate 13, or on the light transmission side of the second optical path separation birefringent plate 13. Moreover, as the low pass filter, a configuration may be adopted in which the wave plate 12 and the IR cut layer which is not shown are stacked in layers, and the optical path separation birefringent plates 11 and 13 are not bonded to the wave plate 12 and the IR cut layer.

The IR cut layer may be formed of an optical interference multilayer film having a reflection operation, or a material having an absorption operation. Examples of the optical interference multilayer film having the reflection operation include a film in which glass or a resin film is used as a base and the optical interference multilayer film is coated on the surface of the base, and a film in which a resin film itself has an optical interference multilayer structure. On the other hand, an example of the material having the absorption operation include a material in which an element or a coloring matter which absorbs light in an infrared region is blended as compositions of glass or a resin.

When the optical interference multilayer film is used, since reflected light is trapped in a device as stray light, sufficient effects are obtained by performing optical design such that the stray light does not affect other optical components, and in consideration that IR cut characteristics change depending on the wavelength according to an incident angle. In addition, with regard to the material having the absorption operation, sufficient effects can be obtained by performing (thermal) design in consideration of an influence resulting from thermal conversion by light absorption. It is to be noted that glass is especially suitable when expansion and contraction by heat and durability are considered.

Figure 2:
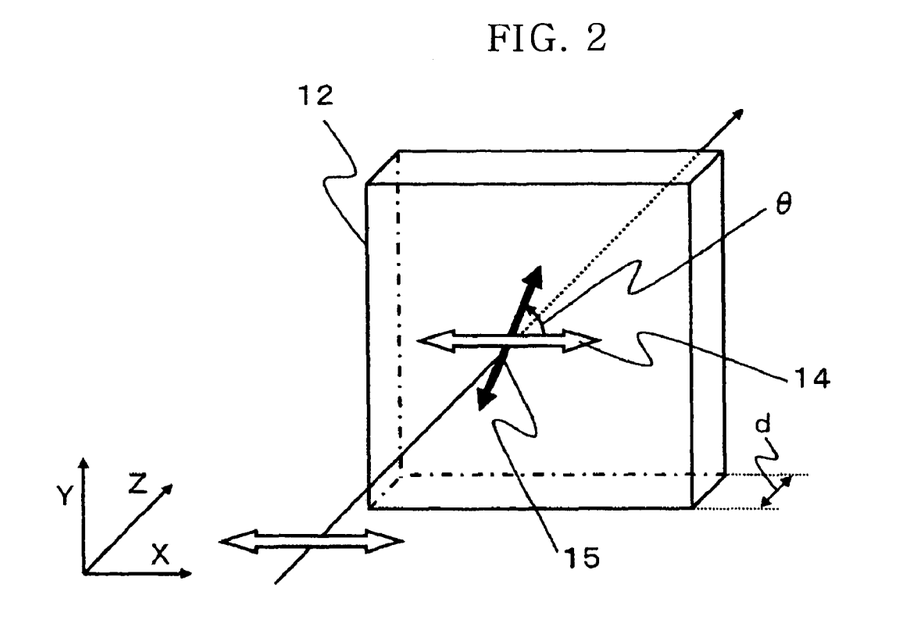
FIG. 2 is a schematic view showing a relation between an optic axis of a wave plate constituting the low pass filter according to the first embodiment and a polarization direction of incident light.

FIG. 2 is a perspective view showing a relation between a polarization direction of light incident on the wave plate 12 and a direction of an optic axis (fast axis or slow axis) of the wave plate 12. Herein, a description is given on the assumption that linearly polarized light 14 in an X direction traveling in a Z direction becomes incident on the first optical path separation birefringent plate. At this point, in order to change the polarization state of the incident light, the wave plate 12 having birefringence firstly disposes the linearly polarized light 14 and the optic axis of the wave plate 12 such that they intersect each other. It is to be noted that the optic axis of the wave plate 12 is in parallel with the X-Y plane and is aligned with a thickness direction (Z direction).

At this point, as shown in FIG. 2, an angle formed by the direction of the linearly polarized light 14 and the direction of an optic axis 15 is represented by θ. The optic axis 15 may be the fast axis or the slow axis. It is to be noted that, for the angle θ, a counterclockwise direction with respect to the direction of the linearly polarized light 14 when viewed from the light incidence side is assumed to be plus (+), and a clockwise direction therewith is assumed to be minus (−). Further, the wave plate 12 having birefringence has an ordinary light refractive index $n_o$, and an extraordinary light refractive index $n_e$ ($n_o \neq n_e$) Refractive index anisotropy Δn can be represented by $\Delta n = |n_e - n_o|$, a retardation value Rd of the wave plate 12 can be represented by the product of the refractive index anisotropy Δn and a thickness d ($Rd = \Delta n \cdot d$), and the polarization state of light passing through the wave plate 12 becomes different when the value Rd becomes different. For example, when a material to which the value of Δn is unique is used, the value of Rd can be changed by changing the value of the thickness d.

Next, by changing the angle θ formed by causing the linearly polarized light 14 (A-polarized light) in parallel with the X direction and the optic axis 15 to intersect each other (hereinafter referred to as an intersection angle) in a range of 0° to 90°, proper conditions for achieving the effect of the present invention are examined. It is to be noted that the optic axis 15 herein is assumed to be the fast axis having the direction of the ordinary light refractive index ($n_o$). The proper conditions mentioned herein may preferably be conditions which allow the transmittance to fall within a range of 50±20% in an entire wavelength range of at least 410 to 600 nm in light incident on the image sensor, and conditions which allow the transmittance to fall within a range of 50±15% are more preferable, and conditions which allow the transmittance to fall within a range of 50±10% are further more preferable. It is to be noted that the wavelength range satisfying the transmittance within the above-described ranges is more preferably a wavelength range of 400 to 650 nm. At this point, as another parameter (variable), the retardation value Rd is changed in a range of 0 to 400 nm in addition to the intersection angle θ.

Figure 3:
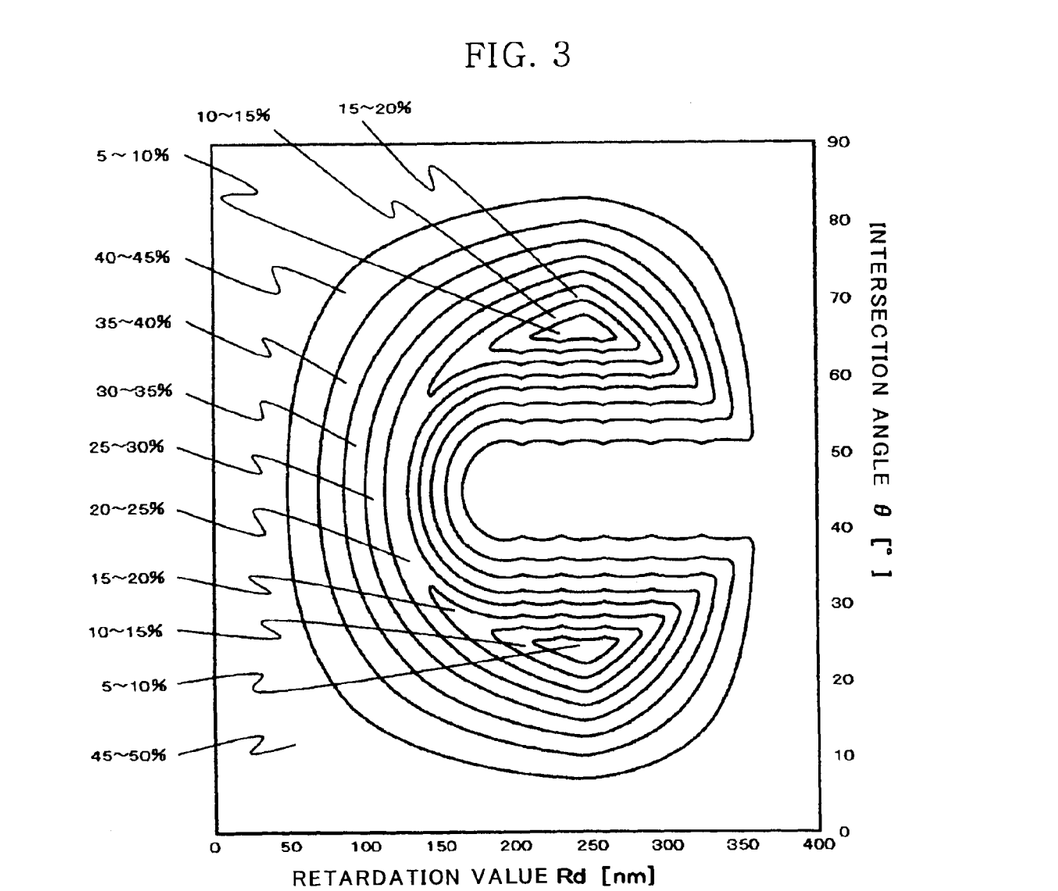
FIG. 3 is a distribution diagram showing a maximum value of a diremption value of a transmittance ($|50-I_x|$) using a retardation value and an intersection angle of the wave plate constituting the low pass filter according to the first embodiment.

FIG. 3 shows distribution characteristics in which the horizontal axis indicates the retardation value Rd, the vertical axis indicates the intersection angle θ, and a value (absolute value) obtained by using the transmittance maximally deviated from 50% in a wavelength range of 410 to 600 nm when light of the wavelength of 410 to 600 nm becomes incident is calculated and shown as the result thereof. It is to be noted that the value obtained by using the transmittance which is maximally deviated from 50% is defined hereinbelow as a diremption value [%]. Herein, when the transmittance under these two arbitrary conditions (Rd, θ) is represented by $I_x$ [%], on the basis of the above-mentioned conditions, the diremption value |50−$I_x$| may be not more than 20%, preferably not more than 15%, and more preferably not more than 10%. By setting the retardation value Rd and the intersection angle θ satisfying these proper conditions, the light quantity of the A-polarized light and that of the B-polarized light can be separated without large deflection so that it is possible to appropriately reduce a moiré phenomenon generated by the image sensor, and suppress degradation of an image quality caused by the light quantity deflection of the separated light beam.

Herein, If the distribution diagram in FIG. 3 is specifically analyzed, when values of coordinates of Rd and θ (Rd [nm], θ [°]) are a combination falling in a region similar to a triangle corresponding to a region surrounded by a point (245, 19), a point (295, 28), and a point (155, 29), or a region surrounded by a point (245, 71), a point (295, 62), and a point (155, 61), the above-described diremption value |50−$I_x$| is not more than 20% with respect to light of any wavelength in 410 to 600 nm, and the combination is preferable.

In addition, when values of coordinates (Rd [nm], θ [°]) are a combination falling in a range similar to a triangle corresponding to a region surrounded by a point (245, 21), a point (280, 26), and a point (180, 27), or a region surrounded by a point (245, 69), a point (280, 64), and a point (180, 63), the above-described diremption value −50−$I_x$| is not more than 15% with respect to the light of any wavelength in 410 to 600 nm, and the combination is more preferable.

Further, when values of coordinates (Rd [nm], θ [°]) are a combination falling in a range similar to a triangle corresponding to a region surrounded by a point (245, 23), a point (265, 25), and a point (215, 25), or a region surrounded by a point (245, 67), a point (265, 65), and a point (215, 65), the above-described diremption value |50−$I_x$| is not more than 10% with respect to the light of any wavelength in 410 to 600 nm, and the combination is further more preferable.

Figure 4:
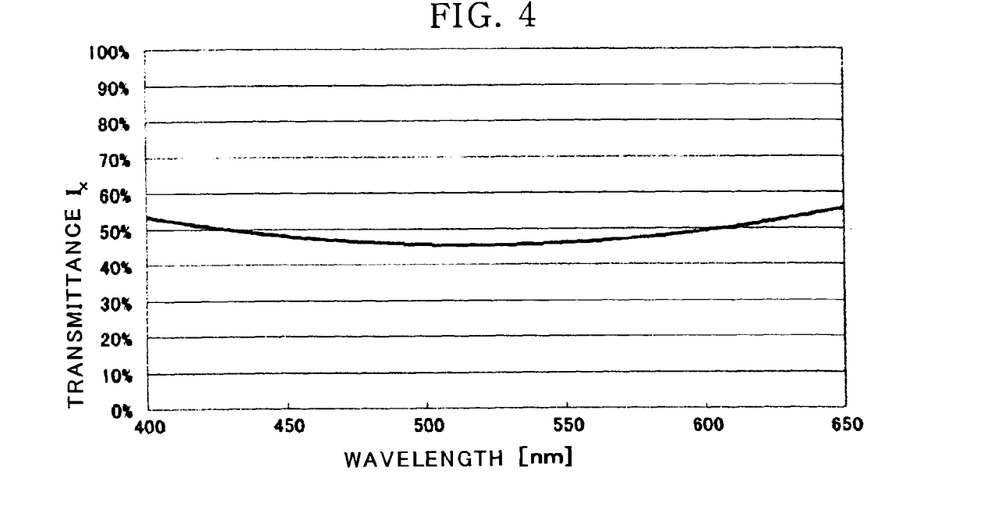
FIG. 4 is a graph view showing characteristics of a transmittance ($I_x$) with respect to a wavelength of the incident light in the wave plate constituting the low pass filter according to the first embodiment.

FIG. 4 is a graph showing incident wavelength dependence of the transmittance when, of the above-described two parameters, the retardation value Rd is set to 245 nm and the intersection angle θ is set to 24° as a combination of the retardation value Rd and the intersection angle θ for achieving the above-described diremption value |50−$I_x$| of not more than 10%, and the combination exhibits excellent characteristics in which the transmittance $I_x$ is close to 50% (diremption value is 0%) in the light of the wavelength of 410 to 600 nm.

In addition, a material forming the wave plate 12 has a wavelength dispersion property as well as the birefringence. That is, the wavelength dispersion property is a property in which the value of the refractive index anisotropy Δn becomes different when the wavelength of incident light becomes different. While the polycarbonate resin is used as the material for the wave plate 12 and the calculation is performed in consideration of the wavelength dispersion property by the wavelength of the incident light in FIG. 3, even when a different material is used, by considering the wavelength dispersion property in the retardation value Rd and setting the intersection angle θ to a proper condition, the similar effect can be obtained. This calculation was performed with the wavelength of 550 nm and a resin film satisfying Δn=0.0645.

Figure 5A:
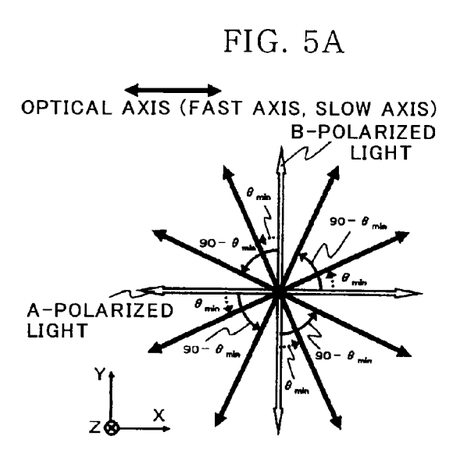
FIGS. 5A and 5B are explanatory views of a combination of the optic axis of the wave plate constituting the low pass filter according to the first embodiment and an incident polarized light direction.
Figure 5B:
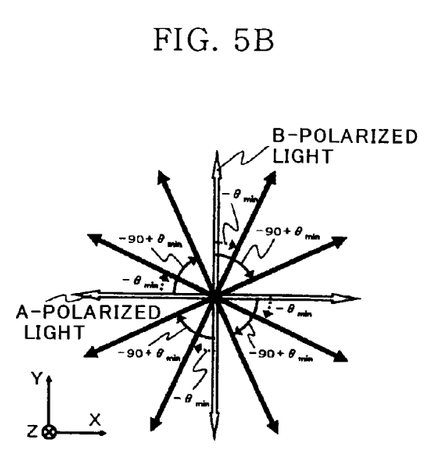

It is to be noted that, although the intersection angle θ has been described as the angle formed by the direction of the A-polarized light and the fast axis direction of the wave plate 12 when the direction of the incident linearly polarized light is the X direction (A-polarized light), the intersection angle θ is not limited thereto. As another combination, even when the intersection angle θ is an angle formed by the direction of the A-polarized light and the slow axis, an angle formed by the B-polarized light and the fast axis, or an angle formed by the direction of the B-polarized light and the slow axis, the similar effect can be obtained. Herein, in any combination of the linearly polarized light incident on the wave plate 12 (A-polarized light and B-polarized light) and the optic axes of the wave pate 12 (fast axis and slow axis), the most acute angle (absolute value is small) of the intersection angle θ with which the effect is obtainable between 0 and 90°, or between 0 and −90° is represented by $θ_{min}$. FIGS. 5A and 5B are views showing a relation between the intersection angle formed by the A-polarized light and the optic axis of the wave plate 12, and the intersection angle formed by the B-polarized light and the optic axis of the wave plate 12. As described above, when the counterclockwise direction is assumed to be plus (+) and the clockwise direction is assumed to be minus (−), the desired transmittance can be obtained at the angle +$θ_{min}$ or −$θ_{min}$ with respect to the direction of the A-polarized light or the B-polarized light. For example, as shown in FIG. 5A, 90−$θ_{min}$ [°] with respect to the A-polarized light corresponds to −$θ_{min}$ [°] with respect to the B-polarized light, as shown in FIG. 5B.

With this arrangement, as shown in FIG. 3, when the most acute angle (absolute value is small) of the intersection angle θ between 0 and 90° or between 0 and −90° is represented by $θ_{min}$ in any combination of the linearly polarized light incident on the wave plate 12 (A-polarized light and B-polarized light beam) and the optic axes of the wave plate 12 (fast axis and slow axis), in a case where values of coordinates of Rd and $θ_{min}$ (Rd [nm], $θ_{min}$ [°] fall in a region surrounded by a point (245, 19), a point (295, 28), and a point (155, 29), or a region surrounded by a point (245, −19), a point (295, −28), and a point (155, −29), the values are preferable. In a case where the values thereof fall in a region surrounded by a point (245, 21), a point (280, 26), and a point (180, 27), or a region surrounded by a point (245, −21), a point (280, −26), and a point (180, −27), the values are more preferable. In a case where the values thereof fall in a region surrounded by a point (245, 23), a point (280, 25), and a point (185, 25), or a region surrounded by a point (245, −23), a point (280, −25), and a point (185, −25), the values are further more preferable.

Thus, the retardation value Rd capable of obtaining the small diremption value is in the vicinity of 250 nm and, in particular, it can be said that the retardation value Rd is in a range which provides a phase difference corresponding to about half of the luminous efficacy of a human being (wavelength of 550 [nm]), i.e., a range having a function as a ½ wavelength plate. Consequently, it can be said from the distribution diagram of FIG. 3 that light passing through the wave plate 12 under the condition of a small diremption value is in a state close to that of the linearly polarized light.

(Second Embodiment)

Figure 6A:
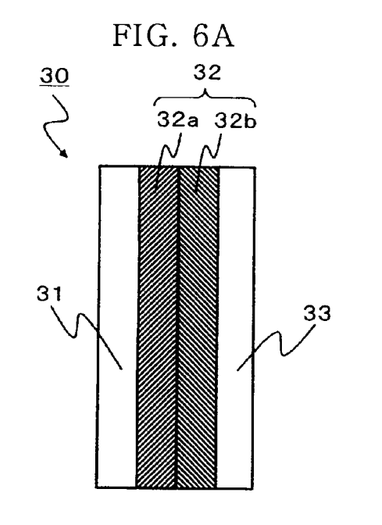
FIGS. 6A and 6B are cross-sectional schematic views of low pass filters according to a second embodiment.
Figure 6B:
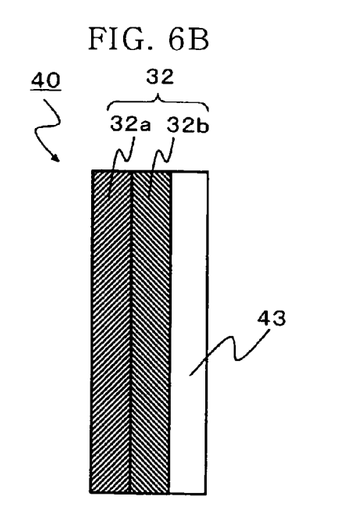

FIGS. 6A and 6B are cross-sectional schematic views showing a configuration of each of low pass filters 30 and 40 according to the present embodiment. The low pass filter 30 shown in FIG. 6A includes a first optical path separation birefringent plate 31, a wave plate 32, and a second optical path separation birefringent plate 33, and light information from the outside is assumed to become incident in this order (Z direction). In addition, although a description is given on the assumption that the separation direction of light incident on the first optical path separation birefringent plate 31 is an X direction, while the separation direction of light incident on the second optical path separation birefringent plate 33 is a Y direction, the separation directions of the optical path separation birefringent plates maybe reversed (Y direction and X direction). Further, in the present embodiment, the description is given on the assumption that the wave plate 32 includes two phase plates each having birefringence, and is configured by stacking a first phase plate 32a and a second phase plate 32b in layers in the order of incidence of the light. It is to be noted that the configuration of the two phase plates is not limited to the configuration in which the two phase plates are so disposed as to be in intimate contact with each other, and may also be a configuration in which an isotropic transparent material (air or the like) is disposed therebetween. The low pass filter 40 shown in FIG. 6B includes the above-described wave plate 32 and an optical path separation birefringent plate 43, and light from the outside is assumed to become incident in this order (Z direction). It is to be noted that the optical path separation birefringent plate 43 has the same function as that of the first optical path separation birefringent plate 31 or the second optical path separation birefringent plate 33. Hereinbelow, the low pass filter 30 is described.

Figure 7:
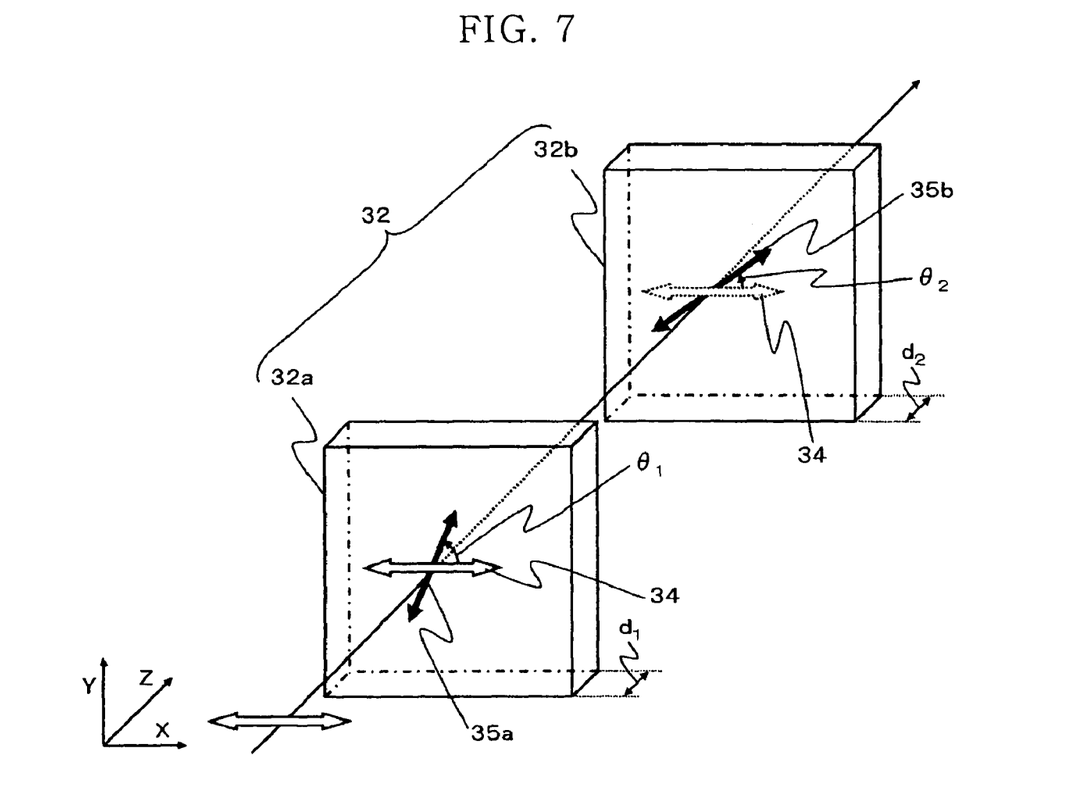
FIG. 7 is a schematic view showing a relation between the optic axis of a wave plate constituting the low pass filter according to the second embodiment and the polarization direction of the incident light.

FIG. 7 is a perspective view showing a relation among the polarization direction of the light incident on the wave plate 32, and the directions of optic axes (fast axis or slow axis) of the first and second phase plates 32a and 32b constituting the wave plate 32. FIG. 7 shows the polarization state of the incident light and the optic axes of the phase plates for convenience sake, and in the actual wave plate, as shown in FIG. 6, the phase plates are stacked in layers so as to be in intimate contact with each other. Similarly to the first embodiment, the description is given on the assumption that a linearly polarized light 34 in the X direction traveling in the Z direction becomes incident on the first optical path separation birefringent plate. In order to change the polarization state of the incident light in the wave plate 32 having the birefringence, the linearly polarized light 34 and the optic axes of the phase plates 32a and 32b are disposed so as to intersect each other. It is to be noted that the optic axes of the phase plates 32a and 32b are aligned in parallel with a thickness direction (Z direction).

At this point, as shown in FIG. 7, an angle formed by the direction of the linearly polarized light 34 incident on the wave plate 32 and the direction of an optic axis 35a of the first phase plate 32a is represented by $\theta_1$. In addition, an angle formed by the direction of the linearly polarized light 34 and the direction of an optic axis 35b of the second phase plate 32b is represented by $\theta_2$. At this point, the optic axis 35a and the optic axis 35b are assumed to be a combination of the fast axis and the fast axis, or a combination of the slow axis and the slow axis. It is to be noted that, in each of the angle $\theta_1$ and the angle $\theta_2$, the counterclockwise direction with respect to the direction of the linearly polarized light 34 when viewed from the light incidence side is assumed to be plus (+), while the clockwise direction therewith is assumed to be minus (−), similarly to the first embodiment. In addition, each of the phase plates 32a and 32b having the birefringence has the ordinary light refractive index $n_o$ and the extraordinary light refractive index $n_e$ ($n_o \neq n_e$), and the refractive index anisotropy $\Delta n$ can be represented by $\Delta n = |n_e - n_o|$. Although materials forming the phase plates 32a and 32b may be different materials as long as they exhibit the birefringence, when the phase plates 32a and 32b are formed of the same material, a distortion resulting from thermal expansion between the two phase plates due to a change in temperature is unlikely to occur so that the phase plates are excellent in product quality, and are preferable in terms of a production cost.

Next, by changing each of the angle (hereinafter referred to as a first intersection angle) $\theta_1$ formed by the linearly polarized light 34 in parallel with the X direction (A-polarized light) and the optic axis 35a of the first phase plate 32a which intersect each other, and the angle (hereinafter referred to as a second intersection angle) $\theta_2$ formed by the A-polarized light and the optic axis 35b of the second phase plate 32b which intersect each other in a range of −90° to 90°, proper conditions for obtaining the effect of the present invention are examined. Herein, although the optic axes 35a and 35b are assumed to be the combination of the fast axes, similar characteristics can be obtained even with the combination of the slow axes. Further, similarly to the first embodiment, the proper conditions mentioned herein may preferably be conditions which allow the diremption value $|50-I_x|$ of not more than 20% in an entire wavelength range of at least 410 to 600 nm of the light incident on the image sensor, conditions which allow the diremption value of not more than 15% are more preferable, conditions which allow the diremption value of not more than 10% are further more preferable, and conditions which allow the diremption value of not more than 5% are most preferable. It is to be noted that the wavelength range satisfying the transmittance in the above-described ranges is more preferably a wavelength range of 400 to 650 nm.

Figure 8:
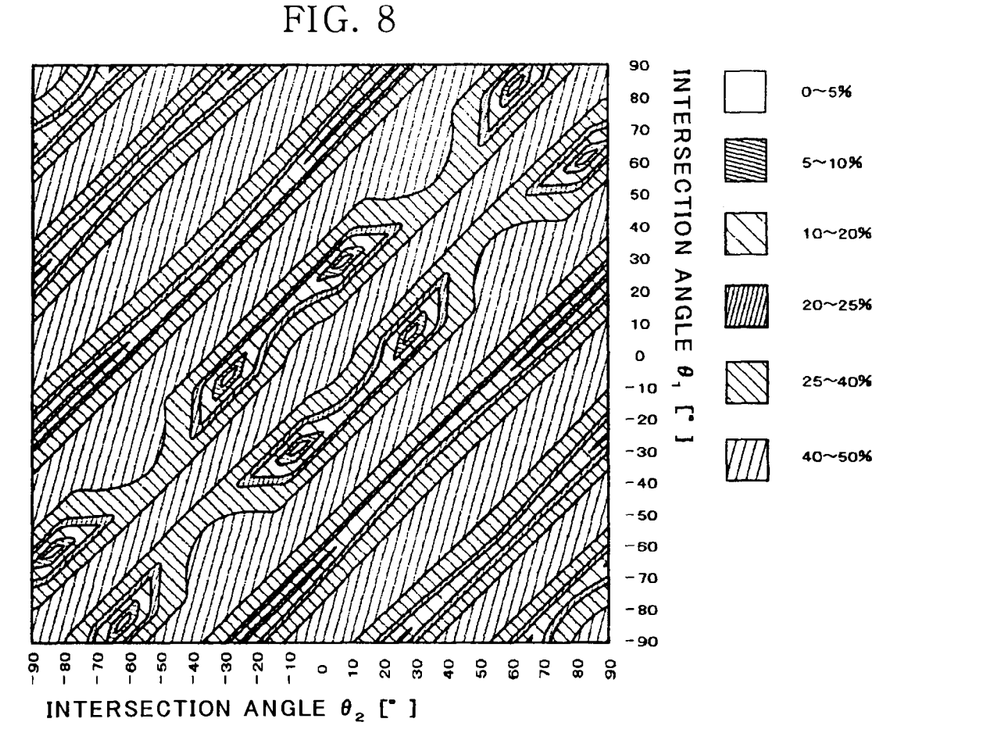
FIG. 8 is a distribution diagram showing the maximum value of the diremption value of the transmittance ($|50-I_x|$) using a combination of intersection angles of two phase plates constituting the low pass filter according to the second embodiment.

FIG. 8 is a view in which the horizontal axis indicates the first intersection angle $\theta_1$, and the vertical axis indicates the second intersection angle $\theta_2$, and shows a calculation result performed by selecting $Rd_1$ and $Rd_2$ having a wide range of combinations of $\theta_1$ and $\theta_2$ which minimize, when light of the wavelength in 410 to 600 nm becomes incident, the diremption value (absolute value) in the corresponding wavelength range, and allow the diremption value of not more than 5%. It is to be noted that the values of $Rd_1$ and $Rd_2$ at this point were 260 nm.

When the transmittance under these two arbitrary conditions ($\theta_1$, $\theta_2$) to be changed with the retardation values fixed as described above is represented by $I_x$ [%], the diremption value $|50-I_x|$ may be not more than 20 [%], preferably not more than 15 [%], and further more preferably not more than 10 [%]. By setting the first and second intersection angles $\theta_1$ and $\theta_2$ satisfying these proper conditions, the light quantity of the A-polarized light and that of the B-polarized light can be separated without large deflection so that it is possible to appropriately reduce the moiré phenomenon generated by the image sensor, and suppress degradation of an image quality caused by the light quantity deflection of the separated light beam. In addition, in the present embodiment in which two phase plates are stacked in layers, the configuration for obtaining the most preferable effect which allows the diremption value $|50-I_x|$ of not more than 5 [%] can be found.

Herein, the distribution diagram of FIG. 8 is specifically analyzed. As described above, combinations which allow the diremption value of at least not more than 20 [%] can be found among combinations satisfying any one of the following Expressions (1) to (4):

$$16 \leq |\theta_1 - \theta_2| \leq 28 \tag{1}$$

$$60 \leq |\theta_1 - \theta_2| \leq 69 \tag{2}$$

$$110 \leq |\theta_1 - \theta_2| \leq 119 \tag{3}$$

$$151 \leq |\theta_1 - \theta_2| \leq 160 \tag{4}$$

It is to be noted that a measure used above is [°], and all of the following Expressions concerning the intersection angle are represented in [°].

In addition, in Expression (1), a condition for $\theta_1 > \theta_2$ is represented by the following Expression:

$$16 \leq (\theta_1 - \theta_2) \leq 28 \tag{5a}$$

and, under conditions satisfying the combination of Expression (5a) and any one of the following Expressions (5b) to (5e), the effect which allows the diremption value within the range of 20 [%] can be obtained:

$$19 \leq \theta_1 \leq 38 \tag{5b}$$

$$-71 \leq \theta_1 \leq -52 \tag{5c}$$

$$52 \leq \theta_2 \leq 71 \tag{5d}$$

$$-38 \leq \theta_2 \leq -19 \tag{5e}$$

Further, in Expression (1), a condition for $\theta_1 < \theta_2$ is represented by the following Expression:

$$-28 \leq (\theta_1 - \theta_2) \leq -16 \tag{6a}$$

and, under conditions satisfying the combination of Expression (6a) and any one of the following Expressions (6b) to (6e), the effect which allows the diremption value within the range of 20 [%] can be obtained:

$$-38 \leq \theta_1 \leq -19 \tag{6b}$$

$$52 \leq \theta_1 \leq 71 \tag{6c}$$

$$-71 \leq \theta_2 \leq -52 \tag{6d}$$

$$19 \leq \theta_2 \leq 38 \tag{6e}$$

Herein, with regard to the two arbitrary conditions ($\theta_1$, $\theta_2$), the design may be performed appropriately such that ranges of $\theta_1$ and $\theta_2$, which satisfy particularly the combination of Expression (5a) and any one of Expressions (5b) to (5e) or the combination of Expression (6a) and Expressions (6b) to (6e), become more effective ranges. For example, a combination which allows the diremption value of not more than 10 [%] includes the following Expression:

$$20 \leq (\theta_1 - \theta_2) \leq 25 \tag{7a}$$

and any one of the following Expressions (7b) to (7e):

$$25 \leq \theta_1 \leq 33 \tag{7b}$$

$$-65 \leq \theta_1 \leq -57 \tag{7c}$$

$$57 \leq \theta_2 \leq 65 \tag{7d}$$

$$-33 \leq \theta_2 \leq -25 \tag{7e}$$

and, conditions satisfying the above-described combination may be adopted appropriately.

Similarly, a combination which allows the diremption value of not more than 10 [%] includes the following Expression:

$$-25 \leq (\theta_1 - \theta_2) \leq -20 \tag{8a}$$

and any one of the following Expressions (8b) to (8e):

$$-33 \leq \theta_1 \leq -25 \tag{8b}$$

$$57 \leq \theta_1 \leq 65 \tag{8c}$$

$$-65 \leq \theta_2 \leq -57 \tag{8d}$$

$$25 \leq \theta_2 \leq 33 \tag{8e}$$

and, conditions satisfying the above-described combination may be adopted appropriately.

In addition, a combination which allows the diremption value of not more than 5 [%] includes the following Expression:

$$21 \leq (\theta_1 - \theta_2) \leq 23 \tag{9a}$$

and any one of the following Expressions (9b) to (9e):

$$27 \leq \theta_1 \leq 31 \tag{9b}$$

$$-63 \leq \theta_1 \leq -59 \tag{9c}$$

$$59 \leq \theta_2 \leq 63 \tag{9d}$$

$$-31 \leq \theta_2 \leq -27 \tag{9e}$$

and, conditions satisfying the above-described combination may be adopted appropriately.

Similarly, a combination which allows the diremption value of not more than 5 [%] includes the following Expression:

$$-23 \leq (\theta_1 - \theta_2) \leq -21 \tag{10a}$$

and any one of the following Expressions (10b) to (10e):

$$-31 \leq \theta_1 \leq -27 \tag{10b}$$

$$59 \leq \theta_1 \leq 63 \tag{10c}$$

$$-63 \leq \theta_2 \leq -59 \tag{10d}$$

$$27 \leq \theta_2 \leq 31 \tag{10e}$$

and, conditions satisfying the above-described combination may be adopted appropriately.

Next, an ellipticity of light passing through the wave plate 32 under conditions which allow the desired diremption value is considered. First, an ellipticity κ and an azimuth angle Ψ when $\theta_1 = 8$ [°] and $\theta_2 = 30$ [°] as conditions for obtaining the diremption value of not more than 5% are satisfied are shown in Table 1. It is to be noted that the values of $Rd_1$ and $Rd_2$ at this point are set to 260 nm. It is to be noted that the azimuth angle Ψ denotes an azimuth angle of the light passing through the wave plate 32 with respect to the direction of the linearly polarized light incident on the wave plate 32. For example, when the light passes through the wave plate 32 as the linearly polarized light, the azimuth angle Ψ denotes an angle formed with the direction of the linearly polarized light and, in the case of elliptically polarized light, the azimuth angle Ψ denotes an angle formed with the direction of the longer axis of the ellipse. It is to be noted that, with regard to a sign, as described in FIG. 7, the counterclockwise direction with respect to the direction of the incident polarized light is assumed to be plus (+).

TABLE 1

$\theta_1 = 8 \, [°], \theta_2 = 30 \, [°]$

| WAVELENGTH λ [nm] | ELLIPTICITY κ | AZIMUTH ANGLE Ψ [°] |
|---|---|---|
| 400 | −0.205 | 45.903 |
| 450 | −0.085 | 45.442 |
| 500 | −0.020 | 44.190 |
| 550 | 0.017 | 11.139 |
| 600 | 0.058 | 44.957 |
| 650 | 0.109 | 45.758 |

In addition, Tables 2(a) to 2(d) show the ellipticities κ and the azimuth angles Ψ under conditions satisfying Expression (7a) and Expression (7b), and conditions satisfying Expression (7a) and Expression (7c) which allow the diremption value of not more than 10%. For example, in Table 2(a), the lower limit value of $\theta_1$ (=25 [°]) in Expression (7b) is substituted for $\theta_1$ in Expression (7a), and the value of $\theta_2$ (=5 [°]) is determined such that the value of $\theta_1-\theta_2$ takes the lower limit value of 20. Similarly, in Table 2(b), the upper limit value of $\theta_1$ (=33 [°]) is substituted for $\theta_1$ in Expression (7a), and the value of $\theta_2$ (=8 [°]) is determined such that the value of $\theta_1-\theta_2$ takes the upper limit value of 25.

TABLE 2

| WAVELENGTH λ [nm] | ELLIPTICITY κ | AZIMUTH ANGLE Ψ [°] |
|---|---|---|
| (a) $\theta_1 = 25 \, [°], \theta_2 = 5 \, [°]$ | | |
| 400 | 0.670 | 28.240 |
| 450 | 0.611 | −33.978 |
| 500 | 0.179 | −39.696 |
| 550 | −0.152 | −39.784 |
| 600 | −0.451 | −37.554 |
| 650 | −0.734 | −27.149 |
| (b) $\theta_1 = 33 \, [°], \theta_2 = 8 \, [°]$ | | |
| 400 | 0.621 | 57.306 |
| 450 | 0.627 | −59.003 |
| 500 | 0.184 | −50.501 |
| 550 | −0.156 | −50.359 |
| 600 | −0.463 | −53.812 |
| 650 | −0.747 | −68.591 |
| (c) $\theta_1 = -57 \, [°], \theta_2 = -77 \, [°]$ | | |
| 400 | −0.625 | 55.613 |
| 450 | −0.668 | −44.529 |
| 500 | −0.191 | −40.241 |
| 550 | 0.162 | −40.173 |
| 600 | 0.486 | −41.840 |
| 650 | 0.822 | −51.181 |
| (d) $\theta_1 = -65 \, [°], \theta_2 = -90 \, [°]$ | | |
| 400 | −0.739 | 30.961 |
| 450 | −0.613 | −48.805 |
| 500 | −0.178 | −49.963 |
| 550 | 0.151 | −49.974 |
| 600 | 0.449 | −49.602 |
| 650 | 0.752 | −46.916 |

Thus, in the wavelength range of 400 to 650 nm under the conditions of $\theta_1$ and $\theta_2$ which allow the diremption value of not more than 5% shown in Table 1, the ellipticity κ is not more than about 0.2, and it can be said that the polarization state of the light passing through the wave plate 12 is linearly polarized light. In addition, under the conditions of $\theta_1$ and $\theta_2$ which allow the diremption value of not more than 10% shown in Table 2, the ellipticity κ of the luminous efficacy of a human being (wavelength of 550 [nm]) is not more than about 0.16, which is the smallest value. Thus, it can be seen that the configuration of the wave plate is a configuration for converting the light to the linearly polarized light in the wavelength range of the visible light.

Further, in the wavelength range of 400 to 650 nm under the conditions of $\theta_1$ and $\theta_2$ which allow the diremption value of not more than 5% shown in Table 1, the azimuth angle Ψ indicates values in the vicinity of ±45 [°]. That is, since an angle of about 45 [°] is formed with respect to the A polarization direction and the B polarization direction, the light components of the individual directions become equivalent to each other. Similarly, under the conditions of $\theta_1$ and $\theta_2$ which allow the diremption value of not more than 10% shown in Tables 2(a) to 2(d), since the azimuth angle Ψ does not take a value largely deviated from ±45 [°], the ratio between the component of the A polarization direction and that of the B polarization direction falls in a specific range close to 1:1. Thus, it can be said that, in a desired wavelength range, the resultant diremption value can be reduced by providing conditions which cause the value of the azimuth angle Ψ to approach ±45 [°].

Figure 9:
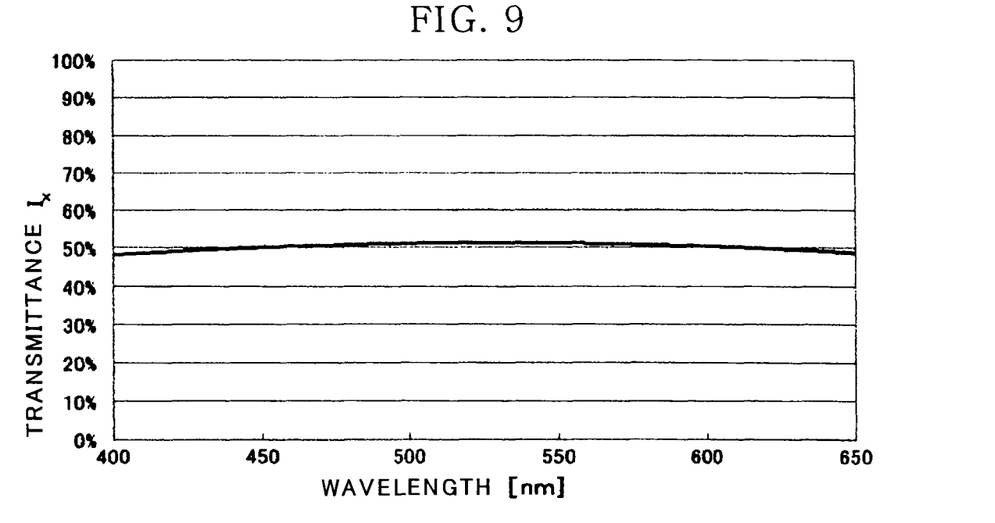
FIG. 9 is a graph view showing characteristics of the transmittance ($I_x$) with respect to the wavelength of the incident light in the wave plate constituting the low pass filter according to the second embodiment.

FIG. 9 is a graph showing incident wavelength dependence of the transmittance in a case where the retardation values $Rd_1$ and $Rd_2$ satisfy $Rd_1=Rd_2=260$ nm, and $\theta_1$ and $\theta_2$ satisfy $\theta_1=8°$ and $\theta_2=30°$ when the light of the wavelength of 550 nm becomes incident. As shown in the graph, in the light of the wavelength of 410 to 600 nm, excellent characteristics are exhibited in which the transmittance $I_x$ is close to 50% (diremption value is 0%).

Figure 10:
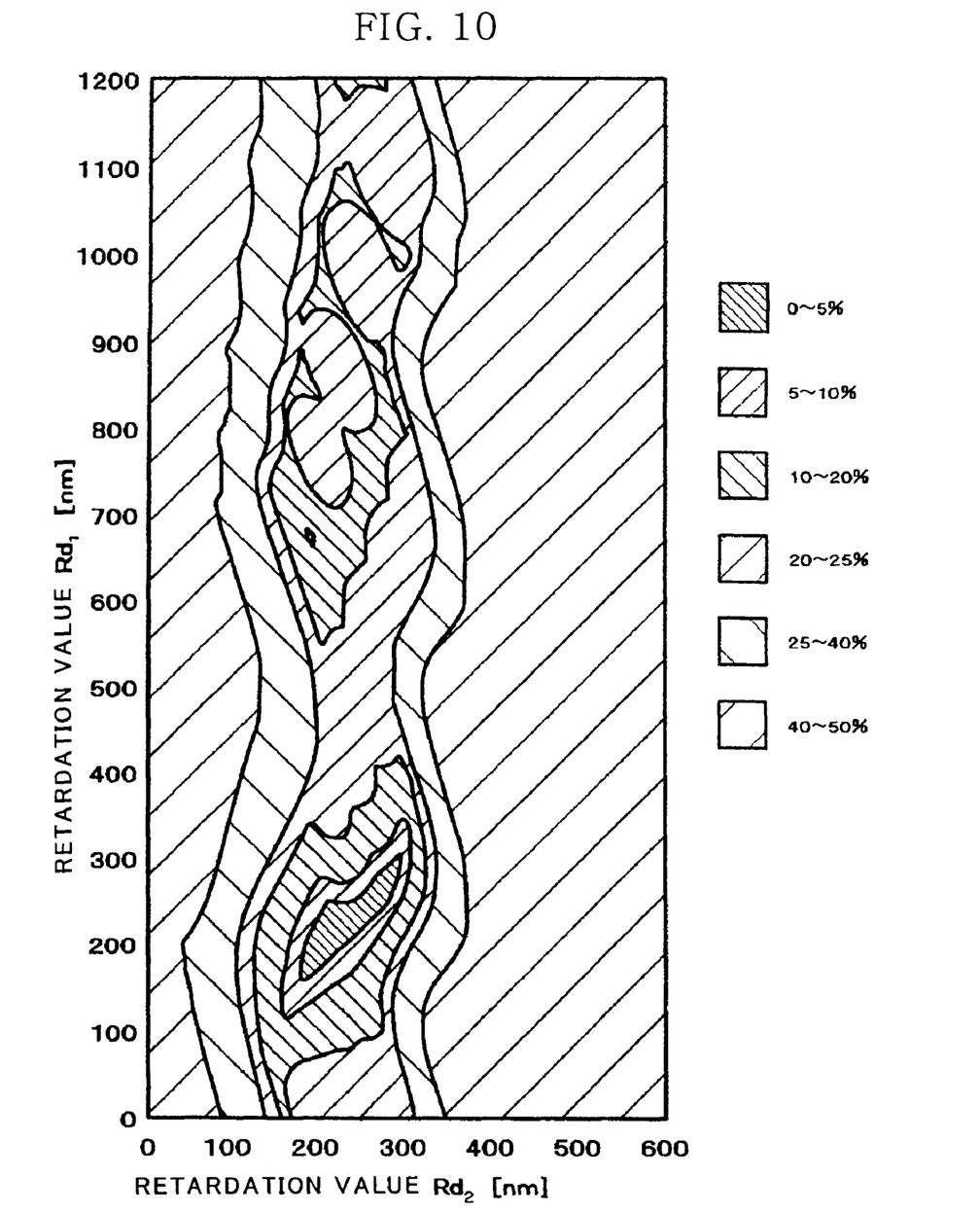
FIG. 10 is a distribution diagram showing the maximum value of the diremption value of the transmittance ($|50-I_x|$) using a combination of retardation values of the two phase plates constituting the low pass filter according to the second embodiment.

Next, a description is given of characteristics when the retardation value $Rd_1$ of the first phase plate and the retardation value $Rd_2$ of the second phase plate are changed. FIG. 10 shows distribution characteristics in which $\theta_1$ and $\theta_2$ are fixed to satisfy $\theta_1=8°$ and $\theta_2=30°$, the horizontal axis indicates the first retardation value $Rd_1$, the vertical axis indicates the second retardation value $Rd_2$, and the diremption value (absolute value) in a wavelength range of 410 to 600 nm when the light of the wavelength of 410 to 600 nm becomes incident is calculated and shown as the result thereof.

Herein, the distribution diagram of FIG. 10 is specifically analyzed. It is to be noted that the calculation was performed on the assumption that $Rd_1$ was in a range of 0 to 1200 nm, and $Rd_2$ was in a range of 0 to 600 nm. In this case, conditions which allow the diremption value $|50-I_x|$ of at least not more than 20 [%] can be selected from combinations in a range represented by $0 \leq Rd_1 \leq 400$ and $130 \leq Rd_2 \leq 320$. In addition, conditions which allow the diremption value $|50-I_x|$ of not more than 10 [%] can be selected from combinations in a range represented by $115 \leq Rd_1 \leq 350$ and $160 \leq Rd_2 \leq 300$. Further, conditions which allow the diremption value $|50-I_x|$ of not more than 5 [%] can be selected from combinations in a range represented by $160 \leq Rd_1 \leq 305$ and $170 \leq Rd_2 \leq 290$.

Herein, when the two phase plates are formed of the same birefringent material, and have the same thickness ($d_1=d_2$) and the same retardation value ($Rd_1=Rd_2$), there are many preferable points in terms of a product quality and productivity obtained by a reduction in distortion resulting from thermal expansion caused by a change in temperature, and a description is given of a margin of error between $Rd_1$ and $Rd_2$ when the phase plates are designed such that $Rd_1=Rd_2$ is satisfied. First, according to the distribution diagram of FIG. 10, in a case where $Rd_1=Rd_2$ is satisfied, and the retardation values $Rd_1$ and $Rd_2$ are in a range of 150 to 300 [nm], the diremption value $|50-I_x|$ is not more than 10 [%] so that the case is preferable. Further, in a case where $Rd_1=Rd_2$ is satisfied, and the retardation values $Rd_1$ and $Rd_2$ are in a range of 160 to 290 [nm], the diremption value $|50-I_x|$ is not more than 5 [%] so that the case is more preferable.

In addition, when the margin of error between the values of $Rd_1$ and $Rd_2$ is considered, even in a case where $Rd_2$ is in the range of 160 to 290 [nm] and $Rd_1$ becomes different from $Rd_2$, as long as the margin includes a range represented by $-45 \leq Rd_2 - Rd_1 \leq 45$, it is possible to achieve the diremption value $|-50 - I_x|$ of not more than 10 [%]. Further, even in a case where $Rd_2$ is in a range of 180 to 280 [nm] and $Rd_1$ becomes different from $Rd_2$, as long as the margin includes a range represented by $-15 \leq Rd_2 - Rd_1 \leq 20$, it is possible to achieve the diremption value $|50 - I_x|$ of not more than 5 [%]. Consequently, even when the difference occurs between the retardation values of the two phase plates, by satisfying the above-described conditions, it is possible to obtain a specific effect.

Thus far, although $\theta_1$ and $\theta_2$ have been fixed to satisfy $\theta_1 = 8°$ and $\theta_2 = 30°$, and $Rd_1$ and $Rd_2$ have been changed using FIG. 10, in the distribution diagram of FIG. 8, conditions may be set as a combination of the intersection angles $(\theta_1, \theta_2)$ which allow the diremption value $|50 - I_x|$ of not more than 5 [%]. In this case as well, the distribution diagram similar to FIG. 10 can be obtained, and by satisfying these conditions, it is possible to obtain excellent characteristics of the wave plate 32. It is to be noted that, even with a combination having different values of $Rd_1$ and $Rd_2$, conditions which allow characteristics obtained by a combination of their respective intersection angles $\theta_1$ and $\theta_2$ to be the most excellent may be selected appropriately, and the range in which the conditions can be obtained is preferably wider because the margin of error occurring with respect to a desired setting becomes larger.

EXAMPLES

Example 1

As the wave plate 12 of the low pass filter 10 according to the first embodiment, a polycarbonate film is subjected to a drawing process, and a film exhibiting birefringence is thereby obtained. At this point, the retardation value with respect to light of the wavelength of 550 nm is set to 245 nm. The film is cut into predetermined size, and is bonded to an IR cut glass surface for reducing the light quantity in an infrared region using a transparent adhesive. Further, two optical path separation birefringent plates formed of crystal are bonded to the film so as to sandwich the film using the transparent adhesive such that separation directions of optical paths are orthogonal to each other, and a low pass filter is thereby fabricated.

Light as linearly polarized light is caused to become incident on the low pass filter, and the low pass filter is adjusted such that an intersection angle $(=\theta)$ as an angle formed by the direction of the linearly polarized light and the fast axis of the wave plate 12 is 24°. At this point, the direction of the linearly polarized light is assumed to be A polarization and, when the light of the A polarization in 410 to 600 nm becomes incident, the light quantity of the light of the A polarization passing through the low pass filter and the light quantity of B polarization orthogonal to the A polarization with respect to the light quantity of the incident light are in a range of 44 to 54% in any wavelength described above, and it can be seen that the light quantity of the A polarization and that of the B polarization are almost equivalent to each other.

Example 2

As the wave plate 32 of the low pass filter 30 according to the second embodiment, a polycarbonate film is subjected to a drawing process, and a film exhibiting birefringence is thereby obtained. At this point, the retardation value with respect to light of the wavelength of 550 nm is set to 260 nm. The film is cut into predetermined size, and two film pieces are stacked on each other such that their respective fast axes form an angle of 22° and bonded together using a transparent adhesive, and the bonded film pieces are bonded to an IR cut glass surface using the transparent adhesive. Further, two optical path separation birefringent plates formed of crystal are bonded to the film pieces so as to sandwich the film pieces using the transparent adhesive such that separation directions of optical paths are orthogonal to each other, and a low pass filter is thereby fabricated.

Light as linearly polarized light is caused to become incident on the low pass filter, and the low pass filter is adjusted such that an intersection angle $(=\theta_1)$ formed by the direction of the linearly polarized light and the fast axis of the first phase plate 32a of the wave plate 32 is 8°, and an angle $(=\theta_2)$ formed by the direction of the linearly polarized light and the fast axis of the second phase plate 32b is 30°. At this point, the direction of the linearly polarized light is assumed to be A polarization and, when the light of the A polarization in 410 to 600 nm becomes incident, the light quantity of the light of the A polarization passing through the low pass filter and the light quantity of B polarization orthogonal to the A polarization with respect to the light quantity of the incident light are in a range of 48 to 52% in any wavelength described above, and it can be seen that the light quantity of the A polarization and that of the B polarization are almost equivalent to each other.

While the present invention has been described in detail and with reference to specific embodiments thereof, it will be apparent to one skilled in the art that various changes and modifications can be made therein without departing the spirit and scope thereof.

The present application is based on Japanese Patent Application No. 2008-220884 filed on Aug. 29, 2008, and the contents thereof are incorporated herein by reference.

Industrial Applicability

Thus, it is possible to constitute a wave plate capable of separating incident light as linearly polarized light which is incident light information in a wavelength range of 410 to 600 nm as a visible light region such that light quantities of two orthogonal light components are equivalent to each other. With this, it is possible to appropriately reduce a moiré phenomenon generated by an image sensor constituting an optical low pass filter including this wave plate, and suppress degradation of an image quality caused by light quantity deflection of a separated light beam, and the wave plate is therefore useful.

EXPLANATIONS OF LETTERS OR NUMERAL 10, 20, 30, 40, and 100 low pass filter
11, 21, and 101 first optical path separation birefringent plate
12, 32, and 102 wave plate
13, 33, and 103 second optical path separation birefringent plate
14 polarization direction of light incident on wave plate
15 optic axis direction
23 and 43 optical path separation birefringent plate
32a first phase plate
32b second phase plate
34 linearly polarized light in X direction
35a optic axis direction of first phase plate
35b optic axis direction of second phase plate
101a position of A-polarized light passing through first optical path separation birefringent plate 101b position of B-polarized light passing though first optical path separation birefringent plate
103a and 103c position of A-polarized light passing through second optical path separation birefringent plate
103b and 103d position of B-polarized light passing through second optical path separation birefringent plate
104a optical path of A-polarized light passing through first optical path separation birefringent plate
104b optical path along which A-polarized light having passed through first optical path separation birefringent plate passes through wave plate
105a optical path of B-polarized light passing though first optical path separation birefringent plate
105b optical path along which B-polarized light having passed through first optical path separation birefringent plate passes through wave plate

The invention claimed is:

1. A low pass filter which separates incident light into four light beams of two light beams composed of a component in an A polarization direction, and two light beams composed of a component in a B polarization direction orthogonal to the A polarization direction, comprising:
a first optical path separation birefringent plate for separating the components in the two polarization direction in a first separation direction;
a wave plate; and
a second optical path separation birefringent plate for performing separation in a second separation direction intersecting the first separation direction for each of the components in the two polarization directions which are disposed therein in an order of incidence of the light, wherein
the wave plate includes at least one phase plate for changing a polarization state of the incident light,
when the wave plate is constituted of one phase plate, an optic axis of the one phase plate is so disposed as to intersect both of the A polarization direction and the B polarization direction,
when the wave plate is constituted of two or more phase plates, the respective optic axes of at least two of the phase plates are so disposed as to intersect each other and intersect both of the A polarization direction and the B polarization direction, and
when a light quantity of light having passed through the wave plate in the A polarization direction with respect to a total light quantity of light of a given wavelength out of light having passed through the wave plate is assumed to be $I_x$%, a diremption value $|50-I_x|$ defined by using a value of the $I_x$ which is maximally deviated from 50% with respect to light in a wavelength range of 410 to 600 nm out of the light having passed through the wave plate is not more than 20%,
wherein the light having passed through the wave plate is a linearly polarized light or an elliptically polarized light.

2. The low pass filter of claim 1, wherein
the wave plate includes the one phase plate, and,
when a retardation value of the one phase plate is represented by Rd(nm), an angle formed by a polarization direction of light incident in the A polarization direction or the B polarization direction and the optic axis of the one phase plate is represented by an intersection angle θ(°), and the most acute intersection angle formed by the optic axis with respect to the A polarization direction or the B polarization direction is represented by $\theta_{min}$,
coordinates of the Rd and the $\theta_{min}$(Rd, $\theta_{min}$) fall in a range of a region surrounded by a point (245, 17), a point (310, 30), and a point (130, 31), or a region surrounded by a point (245, −17), a point (310, −30), and a point (130, −31).

3. The low pass filter of claim 1, wherein
the wave plate is formed of a resin material.

4. The low pass filter of claim 1, wherein
an infrared (IR) cut layer for significantly reducing the light quantity of the wavelength in an infrared region is disposed.

5. The low pass filter of claim 1, wherein the light having passed through the wave plate is a linearly polarized light.

6. The low pass filter of claim 1, wherein the light having passed through the wave plate is an elliptically polarized light.

7. A low pass filter which separates incident light into four light beams of two light beams composed of a component in an A polarization direction, and two light beams composed of a component in a B polarization direction orthogonal to the A polarization direction, comprising:
a first optical path separation birefringent plate for separating the components in the two polarization direction in a first separation direction;
a wave plate; and
a second optical path separation birefringent plate for performing separation in a second separation direction intersecting the first separation direction for each of the components in the two polarization directions which are disposed therein in an order of incidence of the light, wherein
the wave plate includes at least one phase plate for changing a polarization state of the incident light,
when the wave plate is constituted of one phase plate, an optic axis of the one phase plate is so disposed as to intersect both of the A polarization direction and the B polarization direction,
when the wave plate is constituted of two or more phase plates, the respective optic axes of at least two of the phase plates are so disposed as to intersect each other and intersect both of the A polarization direction and the B polarization direction, and
when a light quantity of light having passed through the wave plate in the A polarization direction with respect to a total light quantity of light of a given wavelength out of light having passed through the wave plate is assumed to be $I_x$% a diremption value $|50-I_x|$ defined by using a value of the $I_x$ which is maximally deviated from 50% with respect to light in a wavelength range of 410-600 nm out of the light having passed through the wavelength of not more than 15%.

8. The low pass filter of claim 7, wherein
the wave plate includes the one phase plate, and,
when a retardation value of the one phase plate is represented by Rd(nm), an angle formed by a polarization direction of light incident in the A polarization direction or the B polarization direction and the optic axis of the one phase plate is represented by an intersection angle θ(°), and the most acute intersection angle formed by the optic axis with respect to the A polarization direction or the B polarization direction is represented by $\theta_{min}$,
coordinates of the Rd and the $\theta_{min}$(Rd, $\theta_{min}$) fall in a range of a region surrounded by a point (245, 17), a point (310, 30), and a point (130, 31), or a region surrounded by a point (245, −17), a point (310, −30), and a point (130, −31).

9. The low pass filter of claim 7, wherein
the wave plate is formed of a resin material.

10. The low pass filter of claim 7, wherein
an infrared (IR) cut layer for significantly reducing the light quantity of the wavelength in an infrared region is disposed.

11. The low pass filter of claim 7, wherein the wave plate is constituted of two or more phase plates.

12. A low pass filter which separates incident light into four light beams of two light beams composed of a component in an A polarization direction, and two light beams composed of a component in a B polarization direction orthogonal to the A polarization direction, comprising:
a first optical path separation birefringent plate for separating the components in the two polarization direction in a first separation direction;
a wave plate; and
a second optical path separation birefringent plate for performing separation in a second separation direction intersecting the first separation direction for each of the components in the two polarization directions which are disposed therein in an order of incidence of the light, wherein
the wave plate includes at least one phase plate for changing a polarization state of the incident light,
when the wave plate is constituted of one phase plate, an optic axis of the one phase plate is so disposed as to intersect both of the A polarization direction and the B polarization direction,
when the wave plate is constituted of two or more phase plates, the respective optic axes of at least two of the phase plates are so disposed as to intersect each other and intersect both of the A polarization direction and the B polarization direction, and
when a light quantity of light having passed through the wave plate in the A polarization direction with respect to a total light quantity of light of a given wavelength out of light having passed through the wave plate is assumed to be $I_x$%, a diremption value $|50-I_x|$ defined by using a value of the $I_x$ which is maximally deviated from 50% with respect to light in a wavelength range of 410-600 nm out of the light having passed through the wave plate of not more than 10%.

13. The low pass filter of claim 12, wherein
the wave plate includes the one phase plate, and,
when a retardation value of the one phase plate is represented by Rd(nm), an angle formed by a polarization direction of light incident in the A polarization direction or the B polarization direction and the optic axis of the one phase plate is represented by an intersection angle $\theta(°)$, and the most acute intersection angle formed by the optic axis with respect to the A polarization direction or the B polarization direction is represented by $\theta_{min}$,
coordinates of the Rd and the $\theta_{min}$, (Rd, $\theta_{min}$) fall in a range of a region surrounded by a point (245, 17), a point (310, 30), and a point (130, 31), or a region surrounded by a point (245, −17), a point (310, −30), and a point (130, −31).

14. The low pass filter of claim 12, wherein
the wave plate is formed of a resin material.

15. The low pass filter of claim 12, wherein
an infrared (IR) cut layer for significantly reducing the light quantity of the wavelength in an infrared region is disposed.

16. The low pass filter of claim 12, wherein the wave plate is constituted of two or more phase plates.

* * * * *